US012663743B2

(12) United States Patent
Suzuki

(10) Patent No.: US 12,663,743 B2
(45) Date of Patent: Jun. 23, 2026

(54) FIXING DEVICE

(71) Applicant: CANON KABUSHIKI KAISHA, Tokyo (JP)

(72) Inventor: Takafumi Suzuki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/970,101

(22) Filed: Dec. 5, 2024

(65) Prior Publication Data

US 2025/0093801 A1 Mar. 20, 2025

Related U.S. Application Data

(63) Continuation of application No. 17/937,331, filed on Sep. 30, 2022, now Pat. No. 12,189,317.

(30) Foreign Application Priority Data

Oct. 4, 2021 (JP) ................................ 2021-163199

(51) Int. Cl.
*G03G 15/20* (2006.01)

(52) U.S. Cl.
CPC ..... *G03G 15/2053* (2013.01); *G03G 15/2017* (2013.01)

(58) Field of Classification Search
CPC ........... G03G 15/2017; G03G 15/2035; G03G 15/2053
See application file for complete search history.

(56) References Cited

U.S. PATENT DOCUMENTS

| | | | | |
|---|---|---|---|---|
| 10,095,164 | B2 * | 10/2018 | Lee | G03G 15/2053 |
| 2005/0163540 | A1 * | 7/2005 | Umezawa | G03G 15/2053 399/328 |
| 2006/0086721 | A1 * | 4/2006 | Wakahara | G03G 15/2042 399/328 |
| 2006/0204291 | A1 * | 9/2006 | Watanabe | G03G 15/2014 399/328 |
| 2016/0170338 | A1 * | 6/2016 | Tateishi | G03G 15/206 399/329 |
| 2020/0073305 | A1 * | 3/2020 | Shinoya | G03G 21/1647 |
| 2020/0272079 | A1 * | 8/2020 | Taguchi | G03G 15/2053 |
| 2020/0387097 | A1 * | 12/2020 | Obata | G03G 15/2064 |
| 2021/0223729 | A1 * | 7/2021 | Maeda | G03G 15/2053 |

FOREIGN PATENT DOCUMENTS

| | | | |
|---|---|---|---|
| JP | H1048993 | A | 2/1998 |
| JP | 2007079319 | A | 3/2007 |
| JP | 2015203779 | A | 11/2015 |

* cited by examiner

*Primary Examiner* — Carla J Therrien
(74) *Attorney, Agent, or Firm* — Canon U.S.A., Inc., IP Division

(57) ABSTRACT

A fixing device for fixing a toner image to the recording medium includes a film unit, a roller, and a frame. The film unit includes a tubular film that rotates while being in contact with the recording medium. The roller is in contact with an outer surface of the tubular film and form a fixing nip portion with the film unit to pinch and convey the recording medium. The frame includes a first side frame to hold one end portion of the film unit and includes a second side frame to hold the other end portion of the film unit. At least one of the first or second side frames includes a first plate and a second plate. The first plate is fixed to the second plate and is disposed on a side of a surface of the second plate orthogonal to a longitudinal direction of the fixing device.

8 Claims, 9 Drawing Sheets

SECTION B-B

FIXING DEVICE

CROSS REFERENCE TO RELATED APPLICATIONS

The present application is a continuation of U.S. patent application Ser. No. 17/937,331, filed on Sep. 30, 2022, claims the benefit of Japanese Patent Application No. 2021-163199, filed Oct. 4, 2021, which is hereby incorporated by reference herein in its entirety.

BACKGROUND

Field

The present exemplary embodiment relates to a fixing device that is mounted on an image forming apparatus, such as an electrophotographic recording type printer or copying machine, and fixes a toner image formed on a recording medium onto the recording medium.

Description of the Related Art

An example of fixing devices is a film heating type fixing device having an excellent on-demand property. Such a fixing device is discussed in Japanese Patent Application Laid-Open No. 2016-114621.

In general, a conventional film heating type fixing device has a fixing nip portion that is formed between a film unit provided with a heater in an internal space of a tubular film and a pressure roller. The film heating type fixing device heats and fixes an unfixed toner image on a recording medium to the recording medium while pinching and conveying the recording medium by the fixing nip portion.

Both end portions of the film unit and the pressure roller are supported by a frame of the fixing device, and each of the both end portions of the film unit is urged toward the pressure roller with a spring, whereby the fixing nip portion is formed. A shaft of the pressure roller is rotatably supported by the frame, and a gear that receives a driving power from a motor is attached to a portion of the shaft outside the frame.

SUMMARY

The present exemplary embodiment is directed to providing a fixing device having a frame with a specific structure.

According to an aspect of the present disclosure, a fixing device for fixing a toner image formed on a recording medium to the recording medium includes a film unit including a tubular film that is configured to rotate while being in contact with the recording medium, a roller configured to be in contact with an outer surface of the tubular film, wherein the roller and the film unit form a fixing nip portion configured to pinch and convey the recording medium on which the toner image is formed, and a frame that includes a first side frame configured to hold one end portion of the film unit in a longitudinal direction of the fixing device and includes a second side frame configured to hold the other end portion of the film unit in the longitudinal direction, wherein at least one of the first side frame and the second side frame includes a first plate configured to hold at least one of the film unit and the roller, and a second plate disposed substantially parallel to the first plate and having a surface facing the film unit, and wherein the first plate is fixed to the second plate and is disposed on a side of the surface of the second plate orthogonal to the longitudinal direction.

Further features of the present disclosure will become apparent from the following description of exemplary embodiments with reference to the attached drawings.

DESCRIPTION OF THE EMBODIMENTS

The desirable embodiments for carrying out the present disclosure will be illustrated as an example in detail below with reference to the drawings. However, the dimensions, materials, shapes, and relative locations of components described in the exemplary embodiments should be appropriately changed depending on a configuration of a device to which the present disclosure is applied and various conditions, and are not intended to limit the scope of the present disclosure to the following forms.

(1) Overall Configuration of Image Forming Apparatus

Figure 2:
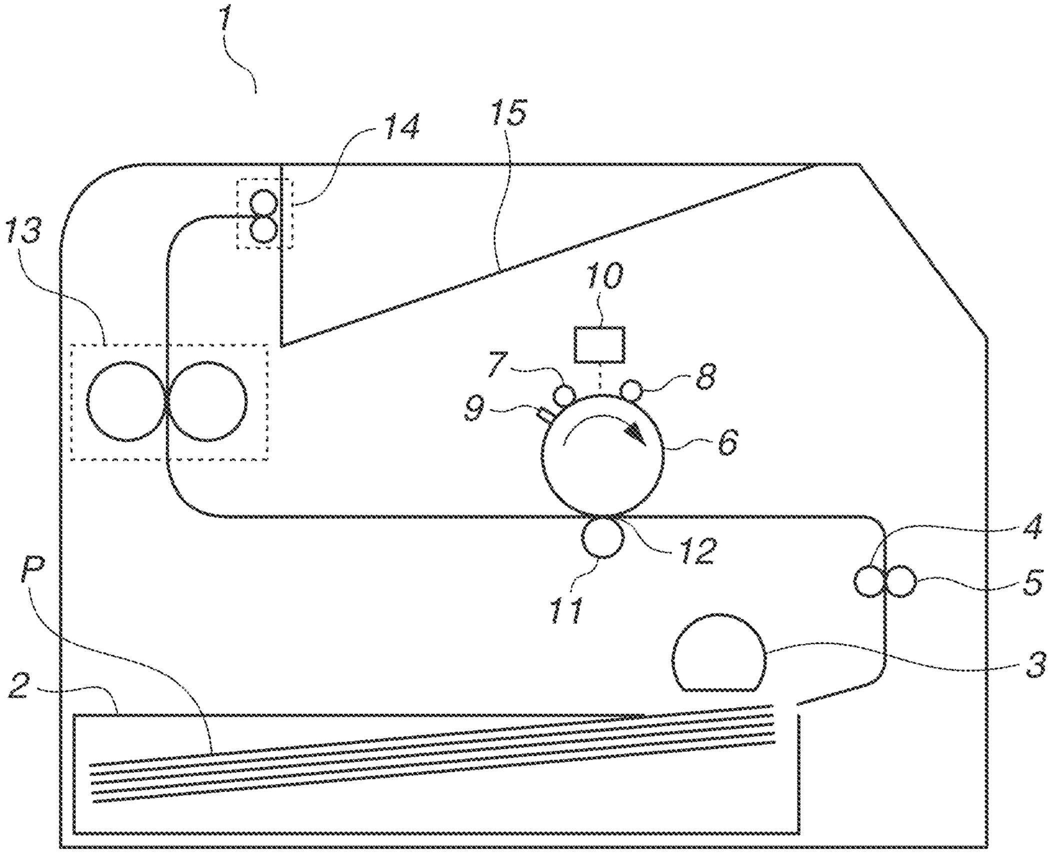
FIG. 2 is a diagram illustrating an overall configuration of an image forming apparatus according to the first exemplary embodiment.

An overall configuration of an image forming apparatus 1 will be described with reference to FIG. 2. The image forming apparatus 1 is a laser beam printer.

The image forming apparatus 1 includes a recording medium feeding unit and an image forming unit. In the recording medium feeding unit, recording media P are stacked in a cassette 2, and a recording medium P on the top of the recording media P is picked up one by one by a paper feed roller 3 and sent to a registration unit. After a posture of the recording medium P is aligned in a conveyance direction in the registration unit including a registration roller 4 and a registration driven roller 5, the recording medium P is fed to an image forming unit.

The image forming unit includes a photosensitive drum 6, a charge device 7 for charging the photosensitive drum 6, a development unit 8 for developing an electrostatic latent image formed on the photosensitive drum 6 with a toner, and a cleaner 9 for removing a residual toner on the photosensitive drum 6. The photosensitive drum 6 is rotationally driven in a direction indicated by an arrow in FIG. 2. The charge device 7 uniformly charges an outer surface of the photosensitive drum 6. A laser scanner 10 for scanning the charged photosensitive drum 6 with a laser beam based on image information is disposed above the image forming unit. The electrostatic latent image is developed as a toner image by the development unit 8. The developed toner image is transferred to the recording medium P passing through a transfer unit 12 including a transfer roller 11 and the photosensitive drum 6.

The recording medium P on which the toner image is transferred is conveyed to a fixing device 13. The toner image on the recording medium P is heated and fixed to the recording medium P by the fixing device 13.

The recording medium P having passed through the fixing device 13 is discharged to a recording medium stacking unit 15 disposed on the top of the image forming apparatus 1 by a discharge roller pair 14.

(2) Fixing Device

Figure 3:
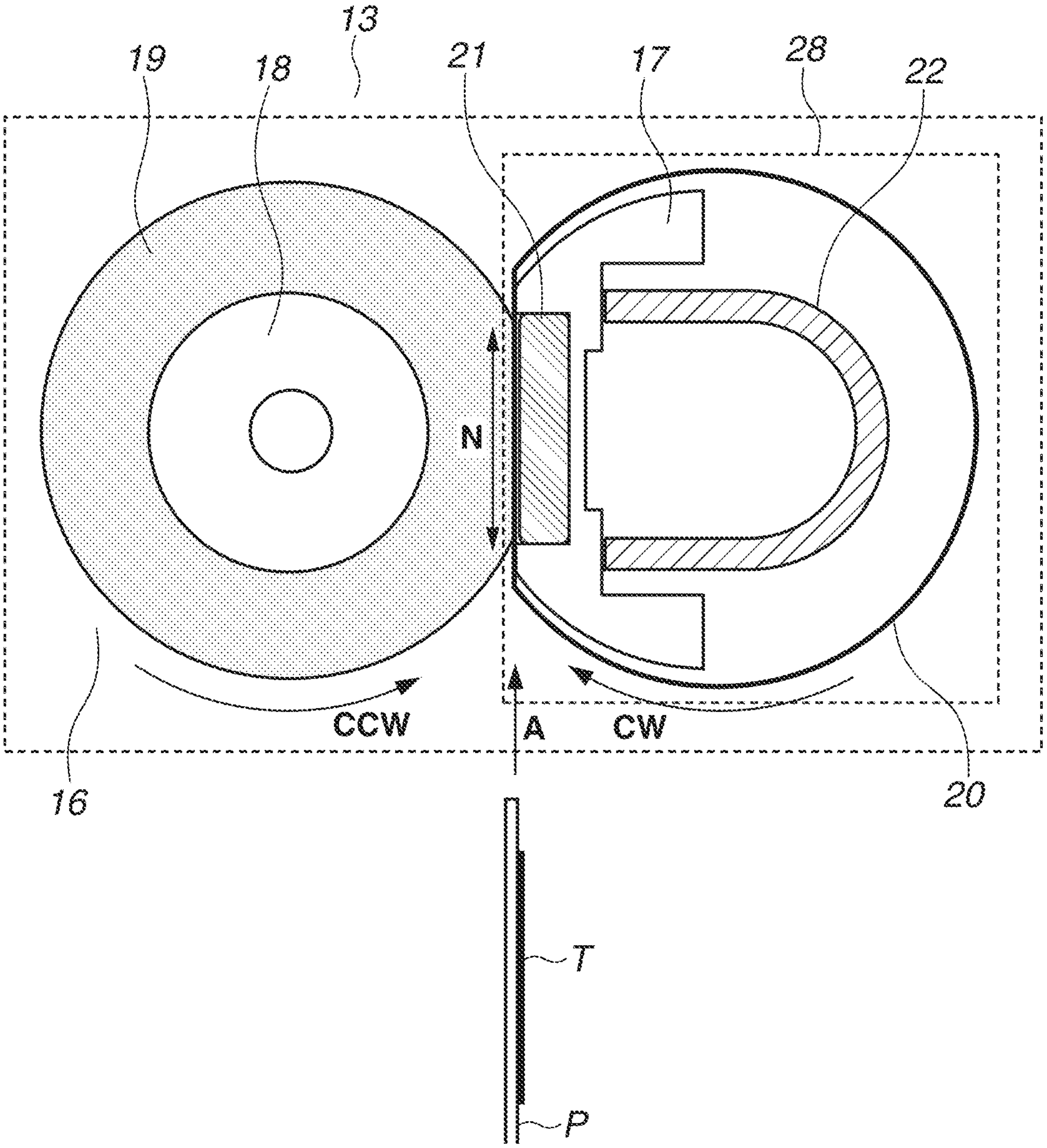
FIG. 3 is a diagram illustrating a cross-sectional view of a fixing device according to the first exemplary embodiment.

FIG. 3 is a diagram illustrating a cross-sectional view of the fixing device 13 according to the present exemplary embodiment. The fixing device 13 is a film heating type fixing device and rotationally drives a pressure roller 16 in a counter clockwise (CCW) direction indicated by an arrow CCW, to rotate a film 20 of a film unit (heating unit) 28 in a clockwise (CW) direction indicated by an arrow CW by a conveyance force of the pressure roller (pressure member) 16.

The film unit 28 includes the film 20 in a tubular form, a heater 21 in a plate shape disposed in an internal space of the film 20, a heater holder 17, formed of a heat-resistant resin, such as a liquid crystal polymer and the like, for holding the heater 21, and a stay 22, formed of metal, for reinforcing the heater holder 17. The film unit 28 further includes two flanges F100 (see FIG. 1) for restricting an offset movement of the film 20 in a longitudinal direction of the fixing device 13. The pressure roller 16 is in contact with an outer surface of the film 20, and a fixing nip portion N is formed between the heater 21 and the pressure roller 16 via the film 20.

The heater 21 is a ceramic substrate on which a heat generation resistor is printed. The heater 21 can be configured such that a surface of a metal substrate is insulated with a glass layer or the like and a heat generation resistor is provided on the glass layer or the like. A metal plate or the like can be interposed between the heater 21 and the film 20. The pressure roller 16 includes a shaft portion 18 and a rubber layer 19.

The fixing device 13 heats and fixes an unfixed toner image T on the recording medium P to the recording medium P while pinching and conveying the recording medium P by the fixing nip portion N in a recording medium conveyance direction indicated by an arrow A.

(3) Overall Configuration of Frame

Figure 4:
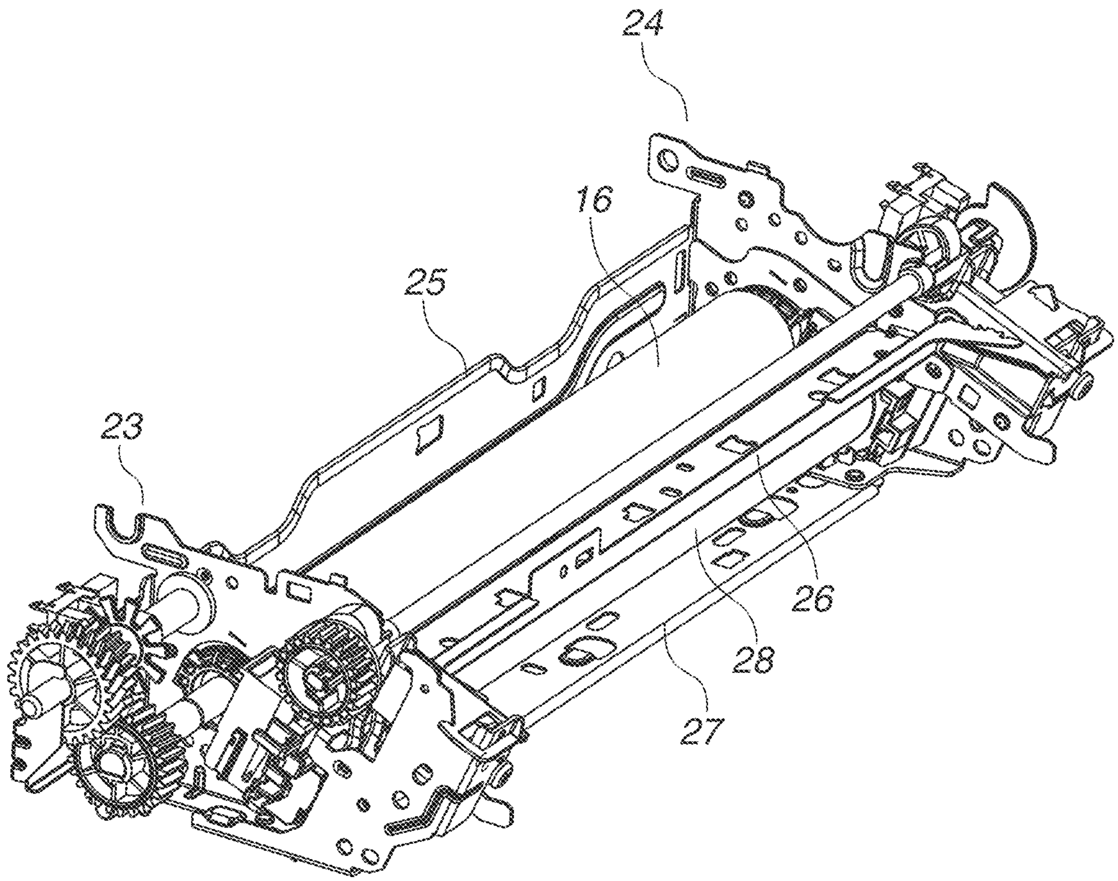
FIG. 4 is a diagram illustrating a perspective view of an overall configuration of a frame of the fixing device according to the first exemplary embodiment.
Figure 5:
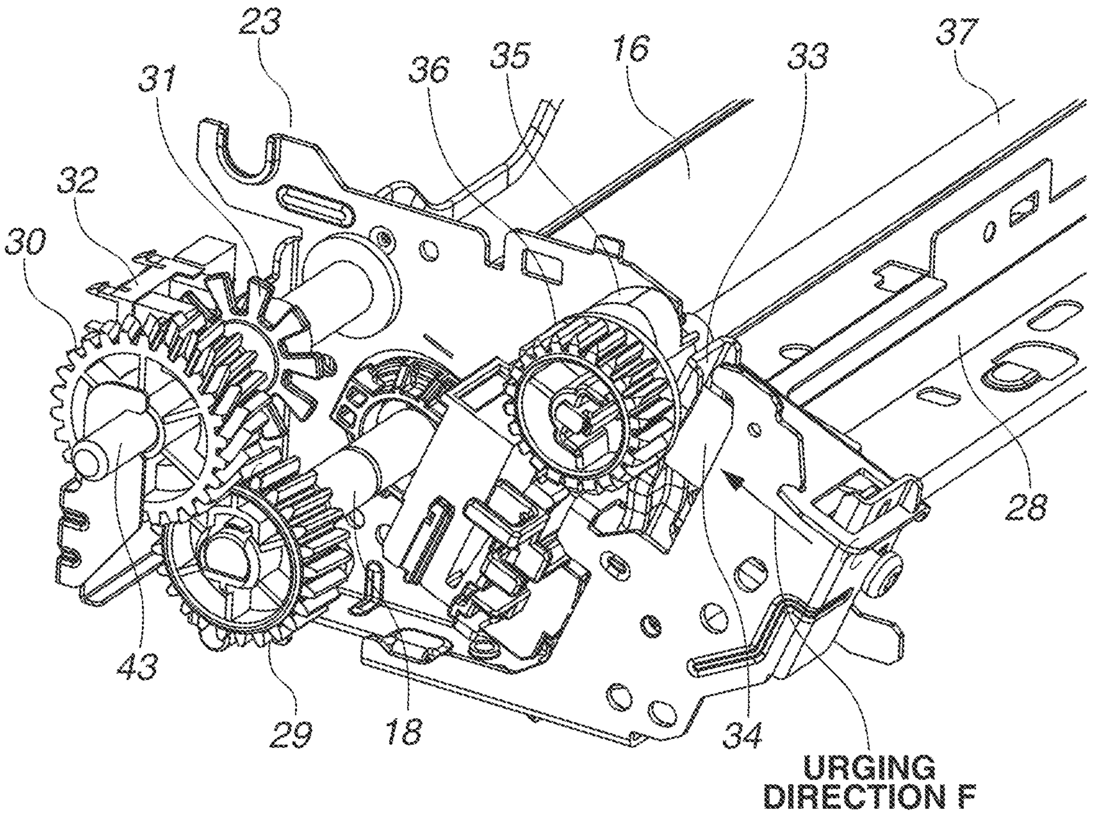
FIG. 5 is a diagram illustrating an enlarged view of the frame on a driving force transmission unit side according to the first exemplary embodiment.
Figure 6:
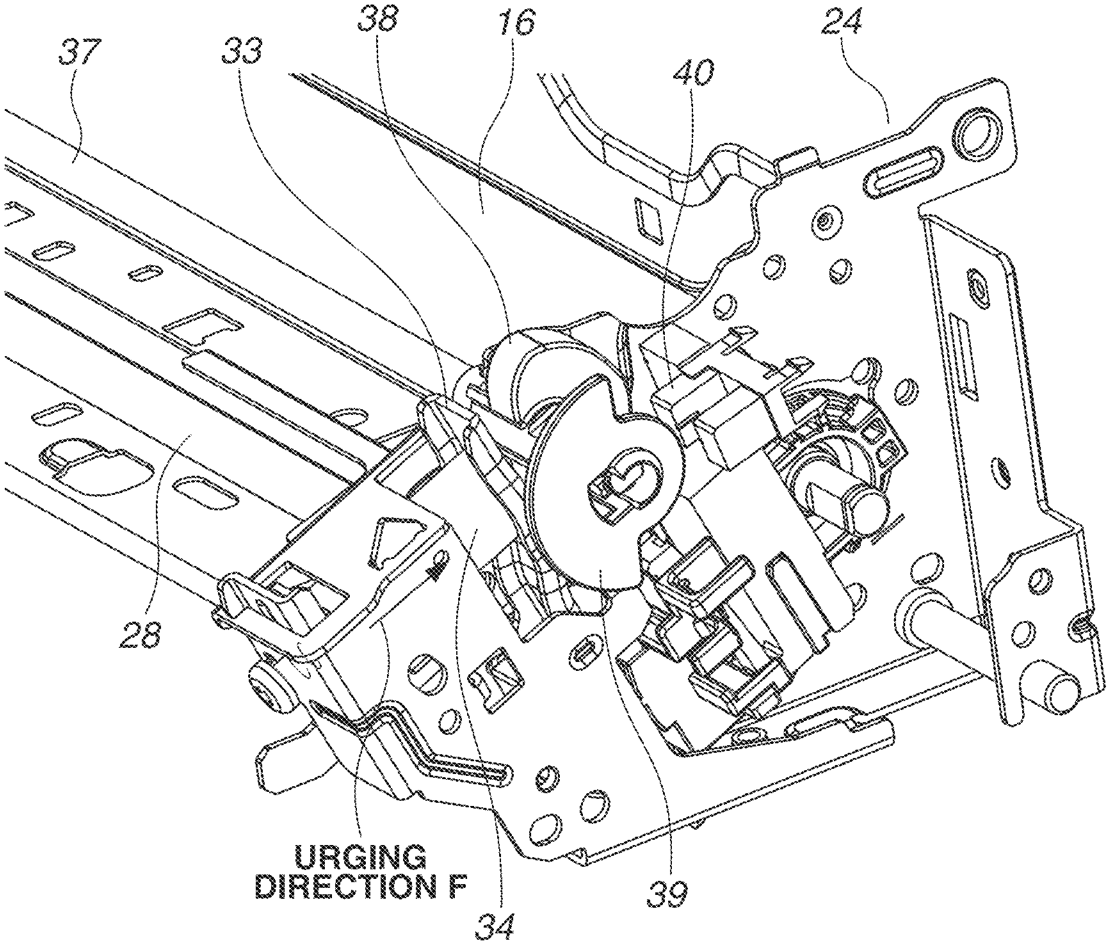
FIG. 6 is a diagram illustrating an enlarged view of the frame on a non-driving force transmission unit side according to the first exemplary embodiment.

FIG. 4 is a diagram illustrating a perspective view of an overall configuration of a frame of the fixing device 13. FIGS. 5 and 6 are diagrams illustrating enlarged views of the frame at an end portion in the longitudinal direction of the fixing device 13.

As illustrated in FIG. 4, a side frame 23 (first side frame) and a side frame 24 (second side frame) are disposed at both end portions in the longitudinal direction of the fixing device 13. A base frame 25 and support frames 26 and 27 are disposed to connect the side frames 23 and 24. Each of the side frames 23 and 24 is fixed to the base frame 25, and the support frames 26 and 27 with screws (not illustrated) and have sufficient rigidity to receive an urging force of a spring 34 (see FIG. 5) for forming the fixing nip portion N. In the present exemplary embodiment, materials of the side frames 23 and 24, the base frame 25, and the support frames 26 and 27 forming the frame of the fixing device 13 are galvanized steel plates.

Next, configurations around the side frames 23 and 24 will be described with reference to FIGS. 5 and 6. On the side frame 23, a driving force transmission unit for rotating the pressure roller 16 is disposed. Specifically, a distal end of an end portion of the shaft portion 18 of the pressure roller 16 has a D-cut cross section, and a pressure roller gear 29 having a through-hole in a D-cut shape is fitted to the shaft portion 18. Further, an idler gear 30 is disposed to mesh with teeth of the pressure roller gear 29. The idler gear 30 is rotatably fitted to a gear shaft 43 crimped to the side frame 23. With this configuration, a driving force is transmitted from a main body of the image forming apparatus 1 to the pressure roller gear 29 via the idler gear 30 to rotate the pressure roller 16. The pressure roller gear 29 and the idler gear 30 are formed of a resin material, such as polyacetal or nylon.

An encoder 31 is disposed coaxially with the idler gear 30, and the encoder 31 rotates with rotation of the idler gear 30. An encoder sensor 32 is disposed in the fixing device 13 and detects a rotation speed of the pressure roller 16. The spring 34 for forming the fixing nip portion N urges the film unit 28 toward the pressure roller 16 via a pressurizing plate 33. The pressurizing plate 33 and the spring 34 are also disposed on the side of the side frame 24. An urging force of the spring 34 is applied to the pressurizing plate 33, the flanges F100, the stay 22, the heater holder 17, the heater 21, the film 20, and the pressure roller 16 in this order.

A cam 35 is disposed at a position opposite to a side of the pressurizing plate 33 on which the spring 34 is disposed. The cam 35 is coupled to a cam gear 36 and is fixed together with the cam gear 36 such that the cam 35 and the cam gear 36 do not rotate with respect to a cam shaft 37. A driving force is transmitted to the cam gear 36 from the main body of the image forming apparatus 1, and when the cam gear 36 rotates, the cam 35 pushes up the pressurizing plate 33 against the urging force of the spring 34. As a result of the pressurizing plate 33 being pushed up, a pressure applied to the fixing nip portion N is reduced (or eliminated). This makes it possible for a user to easily perform jam clearance of the recording medium P near the fixing nip portion N.

A cam 38 is also disposed on the side frame 24 illustrated in FIG. 6 and is fixed such that the cam 38 does not to rotate with respect to the cam shaft 37. A flag 39 is disposed on a rotation shaft of the cam 38, and rotates with rotation of the cam 38. When the flag 39 rotates, a signal of a flag sensor 40 is switched. With this configuration, it is possible to detect whether the fixing device 13 is in a pressurization state in which the fixing nip portion N is formed and a separate state in which the fixing nip portion N is released. The cams 35 and 38 and the cam gear 36 are formed of a resin material, such as polyacetal and nylon. The flag 39 is formed of a black resin material, such as polyphenylene ether (PPE)+polystyrene (PS) not allowing light to transmit in a thickness direction.

(4) Configuration of Side Frame

Figure 1:
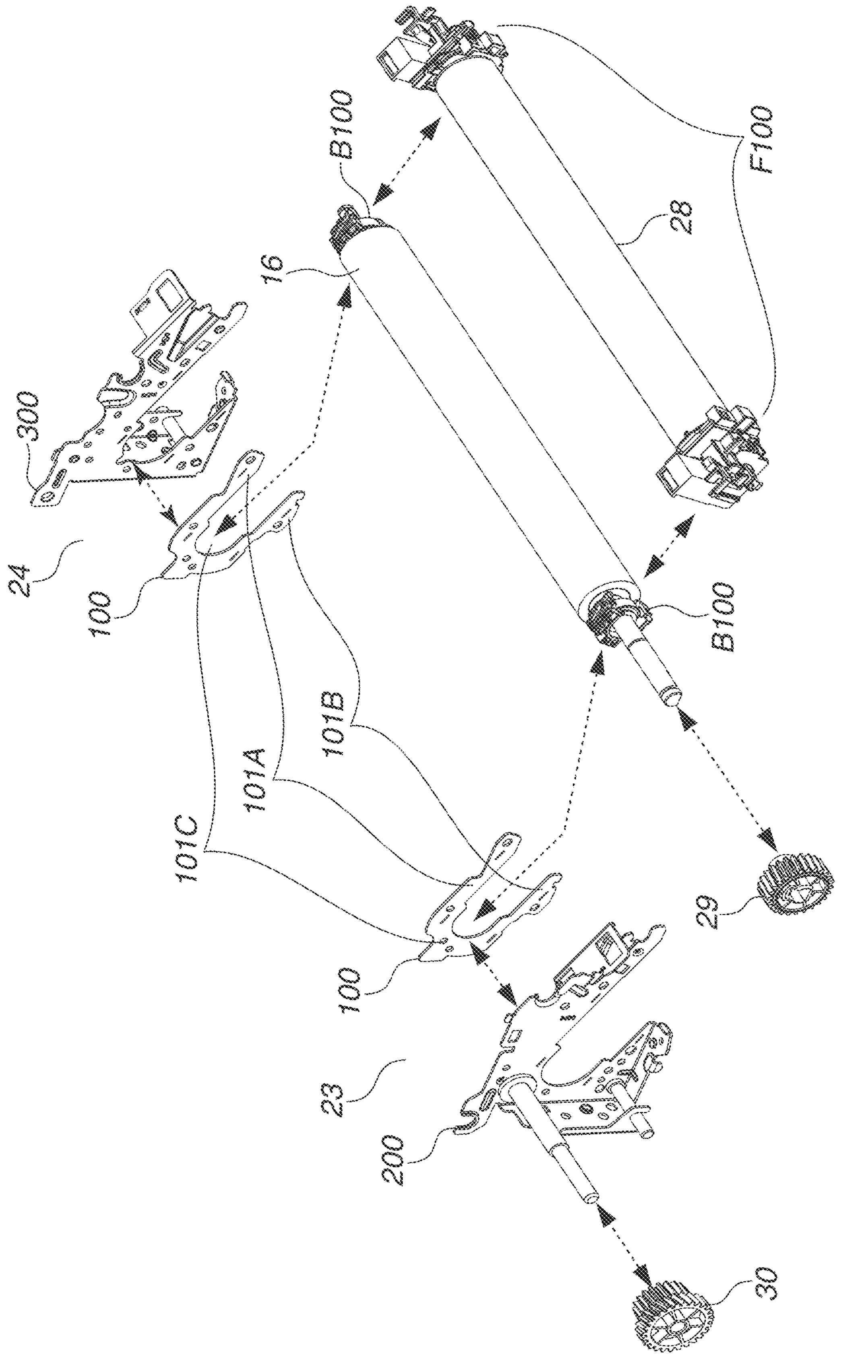
FIG. 1 is a diagram an exploded view of an area around a side frame according to a first exemplary embodiment.
Figure 7:
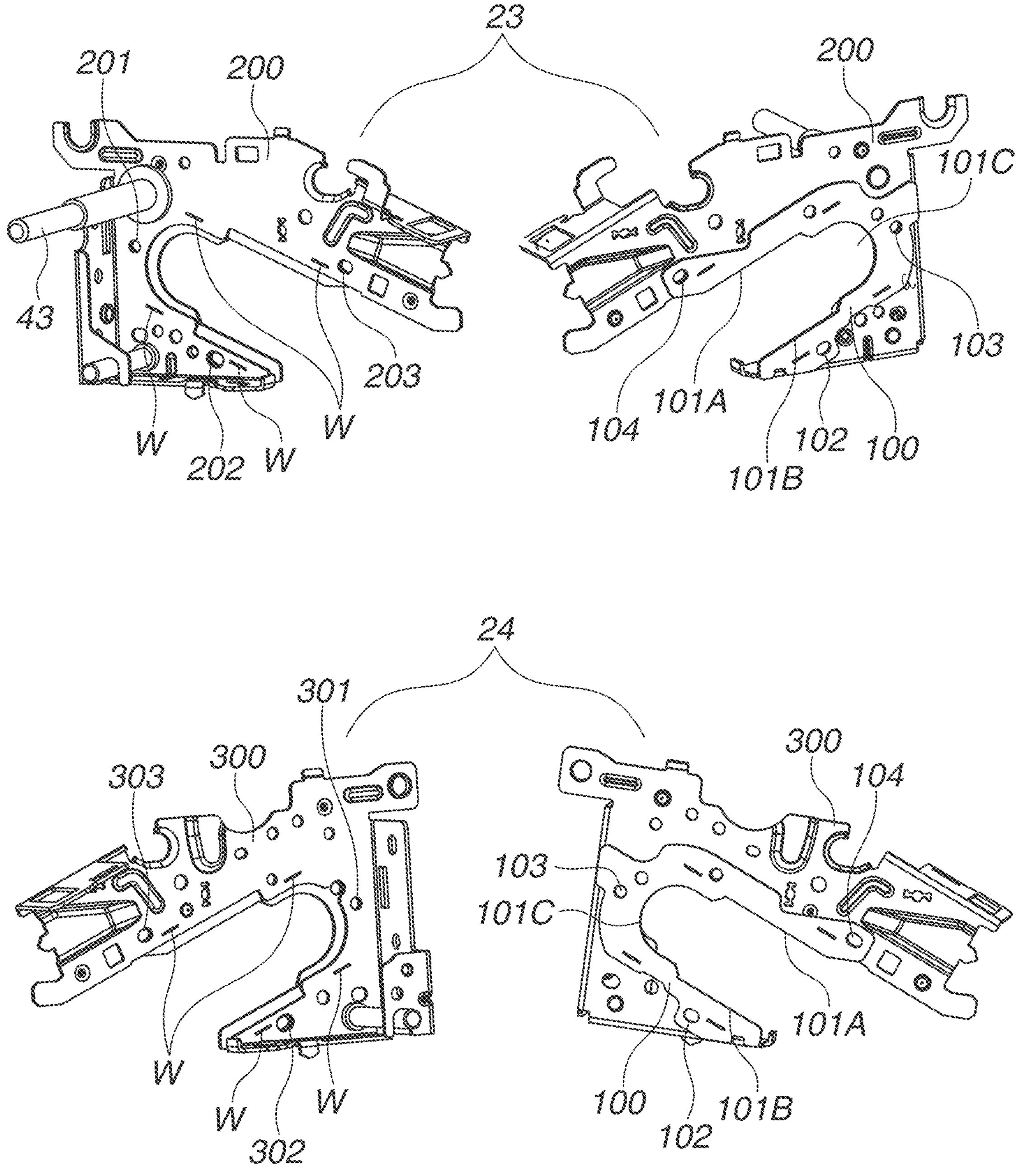
FIG. 7 is a diagram illustrating a perspective view of side frames according to the first exemplary embodiment.

A configuration of the side frames 23 and 24 having a specific structure according to the present exemplary embodiment will be described below. FIG. 1 is an exploded view of an area around the side frames 23 and 24. FIG. 7 is a perspective view of the side frames 23 and 24.

As illustrated in FIG. 1, the side frames 23 and 24 each include two frames. The side frame 23 includes a support frame (first plate) 100 and a first main frame (second plate) 200 for supporting the pressure roller gear 29. The support frame 100 is disposed between the first main frame 200 and the fixing nip portion N in a longitudinal direction of the fixing device 13. That is, the pressure roller gear 29 and the idler gear 30, which are driving force transmission units, are disposed on a surface opposite to a surface on which the support frame 100 of the first main frame 200 is disposed. Similarly, the side frame 24 includes the support frame 100 and a second main frame (second plate) 300 for supporting the flag sensor 40. The support frame 100 is disposed between the second main frame 300 and the fixing nip portion N in the longitudinal direction of the fixing device 13. The side frames 23 and 24 use the support frames 100 having the same shape, and thus accuracy of dimension is improved. The film unit 28 and the pressure roller 16 are fitted to and held in U-shaped fitting portions each formed by edges 101A, 101B, and 101C of the corresponding support frame 100. Specifically, bearings B100 (see FIG. 1) configured to rotatably hold the shaft portion 18 of the pressure roller 16 and the flanges F100 are fitted into the U-shaped fitting portions. The film unit 28 and the pressure roller 16 are positioned by the U-shaped fitting portions with respect to each of a recording medium conveyance direction A and longitudinal direction of the fixing device 13.

Due to an urging force of the spring 34, the bearings B100 abut against the edges 101C each forming a bottom surface of the corresponding U-shaped fitting portion.

Next, the side frames 23 and 24 will be described in detail with reference to FIG. 7. In the side frame 23, surfaces of the support frame 100 and the first main frame 200 are disposed substantially in parallel, and the support frame 100 and the first main frame 200 are fixed by welding. Specifically, there are four welded portions W in each of the side frames 23 and 24. Positions of the welded portions W correspond to a position of the film unit 28 and a position of the pressure roller 16 in an urging direction F of the spring 34. Further, the welded portions W are provided at positions on each of the upstream side and the downstream side of the U-shaped fitting portion in the recording medium conveyance direction A. In the present exemplary embodiment, welding is performed with fiber laser to reduce a welding area of each of the welded portions W, for a purpose of downsizing of the fixing device 13. Further, a scanning direction of the laser in the welded portions W (longitudinal direction of the welded portions W) is substantially parallel to the urging direction F, and thus a strength for receiving the urging force of the spring 34 by the welded portions W is increased. Similarly, in the side frame 24, surfaces of the support frame 100 and the second main frame 300 are arranged substantially in parallel, and the support frame 100 and the second main frame 300 are fixed by welding.

When the side frame 23 is assembled, each of fixing holes 102, 103, and 104 of the support frame 100, and each of fixing holes 201, 202, and 203 of the first main frame 200 are threaded on shafts of an assembly tool to position the support frame 100 and the first main frame 200 in a thickness direction. Further, while the support frame 100 and the first main frame 200 are pressed in the thickness direction of the frames, a laser is irradiated to weld the welded portions W. Similarly, when the side frame 24 is assembled, each of fixing holes 102, 103, and 104 of the support frame 100, and each of fixing holes 301, 302, and 303 of the second main frame 300 are threaded on shafts of an assembly tool to position the support frame 100 and the second main frame 300 in the thickness direction. Further, while the support frame 100 and the second main frame 300 are pressed in the thickness direction of the frames, a laser is irradiated to weld the welded portions W. While, in the present exemplary embodiment, the frames are positioned using the shafts provided in the assembly tool, any method can be used as long as accurate positioning can be performed, in a manner, for example, that positioning between the support frame 100 and the first main frame 200 and positioning between the support frame 100 and the second main frame 300 are performed by embossing and fitting holes.

According to the configuration of the present exemplary embodiment, it is possible to prevent heat generated from the fixing nip portion N from being transmitted to the pressure roller gear 29 and the idler gear 30, which are driving force transmission units disposed on the outside of the side frames 23 and 24. Specifically, the support frame 100, the first main frame 200, and the second main frame 300 are formed of galvanized steel plates, and a surface layer of each of the frames is an organic film. For example, a description is given of a case using a steel plate having the thermal conductivity of 60 Watts per meter-Kelvin (W/mK) in 1.0 millimeter (mm) thickness with an organic film having the thermal conductivity of 0.3 W/mK in 0.1 mm thickness on one side. Compared with a case where one galvanized steel plate is used, an amount of heat energy transferred outside the side frames 23 and 24 out of the amount of the heat energy generated from the fixing nip portion N is one-half (½) in the configuration according to the present exemplary embodiment. Further, due to an air gap between the support frame 100 and the first main frame 200 resulting from surface roughness of the support frame 100 and the first main frame 200 and an air gap between the support frame 100 and the second main frame 300 resulting from surface roughness of the support frame 100 and the second main frame 300, an actual contact area between the support frame 100 and the first main frame 200 and an actual contact area between the support frame 100 and the second main frame 300 are each reduced. As a result, contact thermal resistance is generated, the amount of heat energy transfer is further reduced, and thus, it is possible to prevent the heat from transferring to the pressure roller gear 29 and the idler gear 30.

In the present exemplary embodiment, the frames are welded to each other with fiber laser performed on limited areas, and thus, as compared to the case using continuous welding, it is possible to retain a large area of the organic film of the galvanized steel plate and further possible to increase a heat transfer prevention effect. A heat insulating structure is provided by the support frame 100 and the first main frame 200, and the support frame 100 and the second main frame 300 disposed in the vicinity of the fixing nip portion N, whereby heat diffusion can be efficiently suppressed or reduced. On the contrary, if the support frame 100 is disposed between the driving force transmission unit and the first main frame 200, the heat of the fixing nip portion N is transferred to the support frame 100 and is directly transferred to the driving force transmission unit.

While, in the present exemplary embodiment, the galvanized steel plates are used for the support frame 100, the first main frame 200, and the second main frame 300, a resin can also be used. While the support frame 100, the first main frame 200, and the second main frame 300 are welded by fiber laser, using screwing, crimping, bonding, engaging, or the like can be sufficient as long as the frames are fixed. However, to effectively utilize the contact thermal resistance, it is desirable to limit a close contact area between the frames. In the configuration of the present exemplary embodiment, the encoder sensor 32, the cam 35, the cam 38, and the flag sensor 40 are disposed on the side frames 23 and 24, and the support frame 100 is provided in each of the side frames 23 and 24, which is effective at preventing sensor malfunction and suppressing or reducing a cam abrasion. In a case where a member, such as the flag sensor 40 and the like, is not disposed on the outside of the side frame 24, the support frame 100 and the second main frame 300 can be configured as one frame without being separated. While, in the present exemplary embodiment, the pressure roller 16 is driven by the driving force transmission unit, a heat roller, if the film unit 28 is a high-rigidity heat roller, can be driven, for example.

Figure 8:
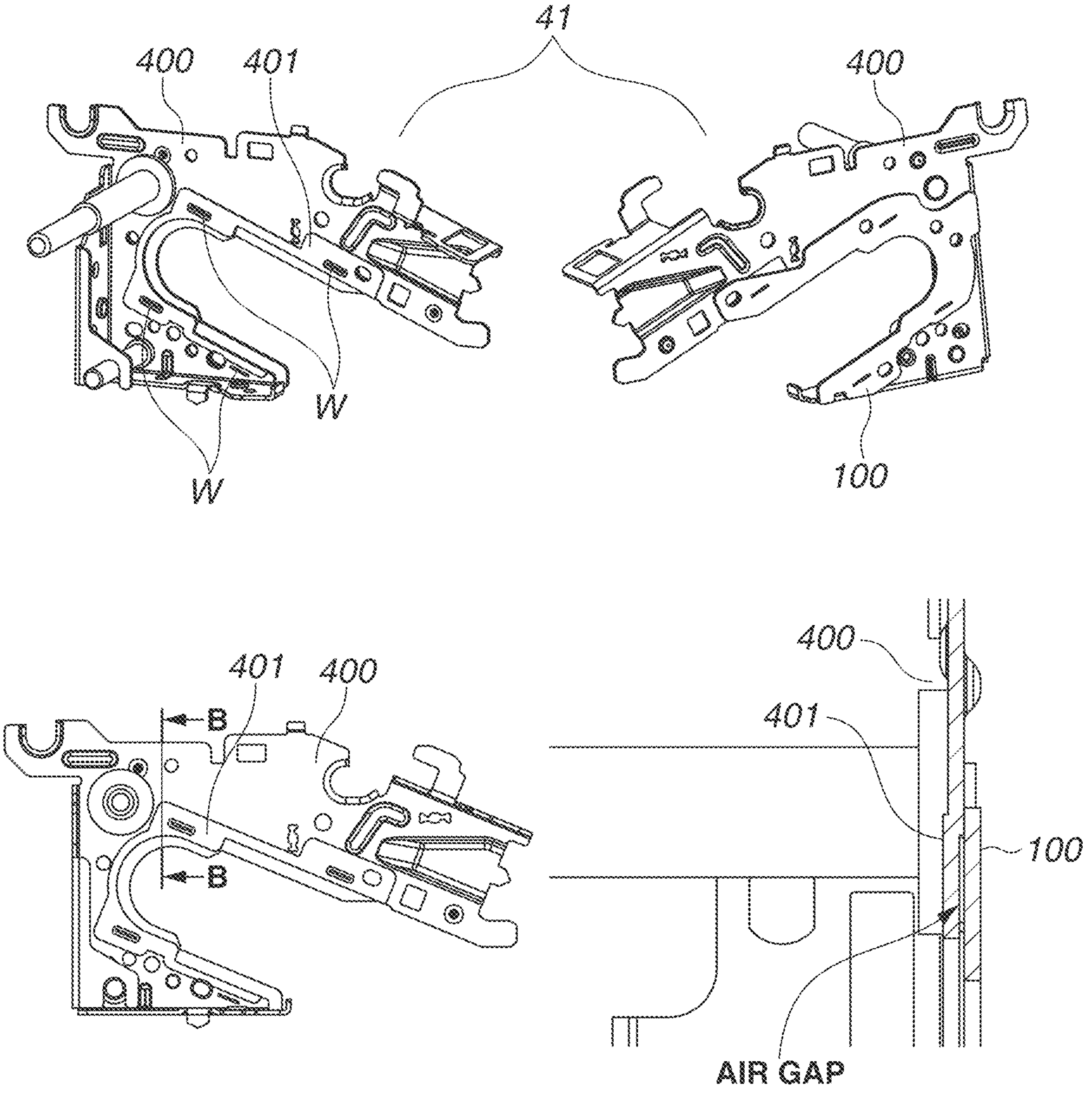
FIG. 8 is a diagram illustrating perspective views and a cross-sectional view of a side frame according to a second exemplary embodiment.

Next, a configuration of a side frame according to a second exemplary embodiment will be described. In the present exemplary embodiment, as illustrated in FIG. 8, a side frame 41 includes the support frame (first plate) 100 and a third main frame (second plate) 400. In order that an air gap is provided between the support frame 100 and the third main frame 400 as illustrated in a diagram of Section B-B, the third main frame 400 is in contact with the support frame 100 only at around each of the welded portions W welded by fiber laser. In an area other than the area around the welded portions W of the third main frame 400, the third main frame 400 is provided with an offset portion 401 offset in a direction in which the driving force transmission unit is disposed.

With the above-described configuration, it is possible to suppress or reduce heat transfer from the support frame 100 to the third main frame 400 by the air gap provided by the offset portion 401. Because air of the air gap is non-convective, the air gap can be used as a heat insulating layer. The air gap formed by the offset portion 401 is 0.3 mm in thickness and has an air thermal conductivity of 0.02 watts per meter-kelvin (W/mK). Compared with the first exemplary embodiment, the amount of heat energy transferred outside the side frame 41 out of the amount of heat energy generated in the fixing nip portion N is about one-twelfth (1/12). While, in the present exemplary embodiment, the third main frame 400 is provided with the offset portion 401, the support frame 100 can also have an offset shape to have an air gap.

Figure 9:
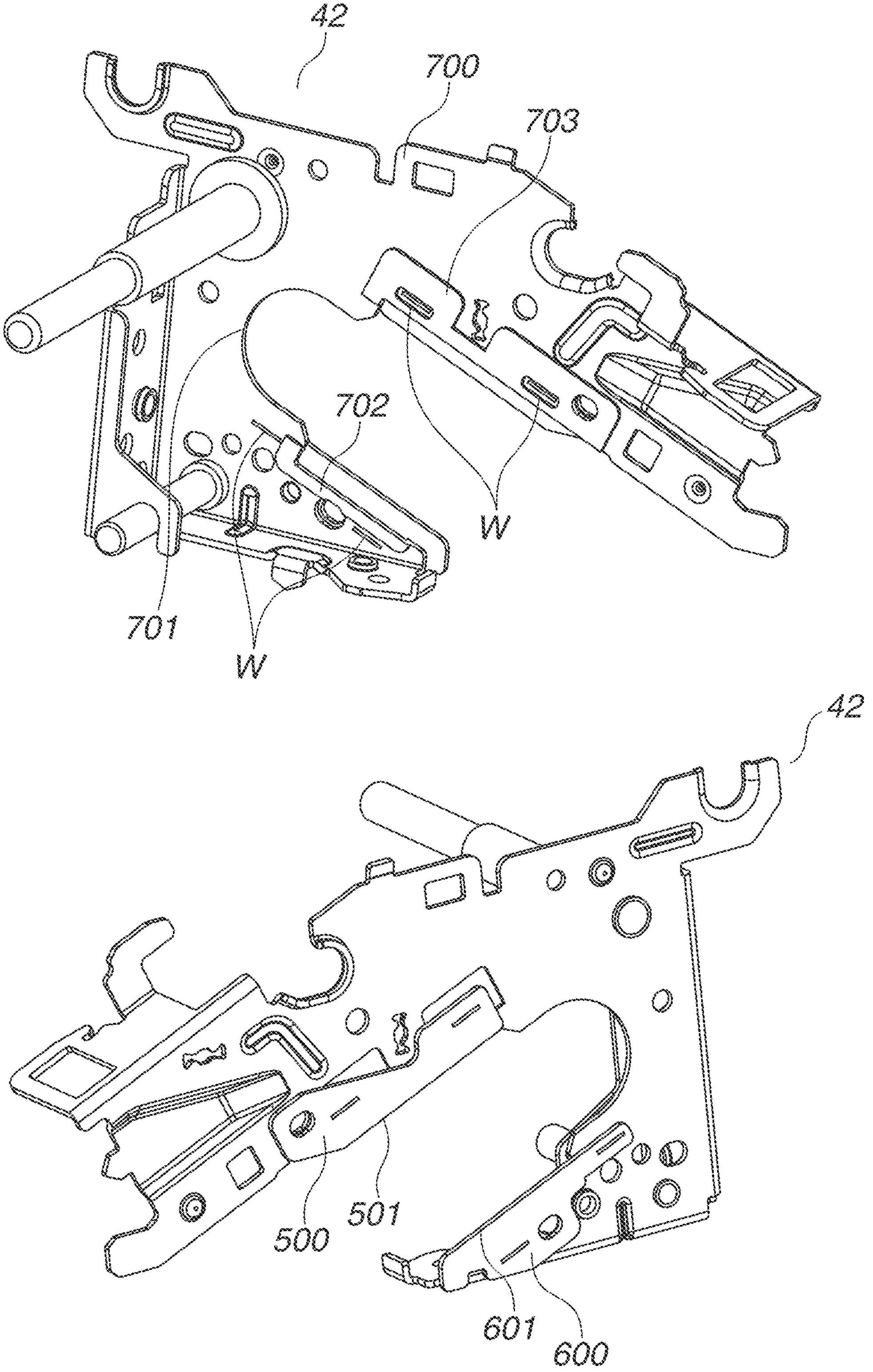
FIG. 9 is a diagram illustrating a perspective view of side frames according to a third exemplary embodiment.

Next, a configuration of a side frame according to a third exemplary embodiment will be described. In the present exemplary embodiment, as illustrated in FIG. 9, a side frame 42 includes a support frame (first plate) 500, a support frame (first plate) 600, and a fourth main frame (second plate) 700. A film unit positioning portion 501 of the support frame 500 and a film unit positioning portion 601 of the support frame 600 position the film unit 28 with respect to each of the recording medium conveyance direction A and the longitudinal direction of the fixing device 13. A U-shaped fitting portion 701 of the fourth main frame 700 positions the pressure roller 16 with respect to each of the recording medium conveyance direction A, the longitudinal direction of the fixing device, and the urging direction F. Similarly to the second exemplary embodiment, the fourth main frame 700 is formed with offset portions 702 and 703.

Even with such a configuration, if it is not possible to form the heat insulating structure around the pressure roller 16, heat insulation is still effective due to the support frame 500 and the support frame 600 positioning the film unit 28. In the present exemplary embodiment, a thickness of the air gap formed in the offset portions 702 and 703 is increased to 0.6 mm, which is twice the thickness of the air gap of the second exemplary embodiment, so that, even if the heat insulating area is reduced, the thickness of the heat insulating layer is increased, and thus, it is possible to suppress or reduce heat transfer to the driving transmission unit.

In the present exemplary embodiment, only the film unit 28 is supported by the support frame 500 and the support frame 600, which are separate components from the fourth main frame 700. Alternatively, a support frame configured to support only the pressure roller 16 can be provided as the support frame, and the support frame can be fixed to a surface of the fourth main frame 700 on the fixing nip portion N side. In addition, depending on an amount of heat generated from the fixing nip portion N, a convection direction of an air in the fixing device 13, and the like, only one of the support frame 500 and the support frame 600 according to the present exemplary embodiment and the fourth main frame 700 can be used to position the film unit 28.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A fixing device for fixing a toner image formed on a recording medium to the recording medium, the fixing device comprising:

a film unit including a tubular film that is configured to rotate while being in contact with the recording medium;

a roller configured to be in contact with an outer surface of the tubular film, wherein the roller and the film unit form a fixing nip portion configured to pinch and convey the recording medium on which the toner image is formed; and a frame that includes a first side frame configured to hold one end portion of the film unit in a longitudinal direction of the fixing device and includes a second side frame configured to hold the other end portion of the film unit in the longitudinal direction, wherein at least one of the first side frame and the second side frame includes a first plate configured to hold at least one of the film unit and the roller, and a second plate disposed substantially parallel to the first plate and having a surface facing the film unit, wherein the first plate is fixed to the second plate on a surface facing the other side frame of the second plate, and wherein as seen in the longitudinal direction, an area of the first plate is smaller than that of the second plate.

2. The fixing device according to claim 1, wherein each of the first plate and the second plate has U-shaped fitting portion configured to hold at least one of the film unit and the roller.

3. The fixing device according to claim 1, wherein a gear shaft of a gear configured to apply a power to the roller is fixed to the second plate.

4. The fixing device according to claim 1, wherein the second plate includes a first area that is in contact with the first plate and includes a second area that is substantially parallel to the first plate and is separated from the first plate in the longitudinal direction, and wherein an air gap is provided between the first plate and the second plate by the second area.

5. The fixing device according to claim 1, further comprising a spring configured to urge the film unit in a direction toward the roller, wherein the first plate holds the film unit and the roller, and wherein the first plate and the second plate are fixed by a plurality of fixing portions, and the plurality of fixing portions is disposed at a position where the film unit is positioned in an urging direction of the spring.

6. The fixing device according to claim 5, wherein the plurality of fixing portions is a portion where the first plate and the second plate are fixed by welding.

7. The fixing device according to claim 1, wherein the film unit includes restriction portions, wherein each of the restriction portions (i) is configured to restrict an offset movement of the tubular film in the longitudinal direction, (ii) faces, at positions, a different one of both end portions of the tubular film in the longitudinal direction, and (iii) is attached to the first plate.

8. The fixing device according to claim 1, wherein, in an internal space of the film unit, an elongated heater is provided along the longitudinal direction, and the tubular film is held between the elongated heater and the roller.

* * * * *